United States Patent Office 3,512,153
Patented May 12, 1970

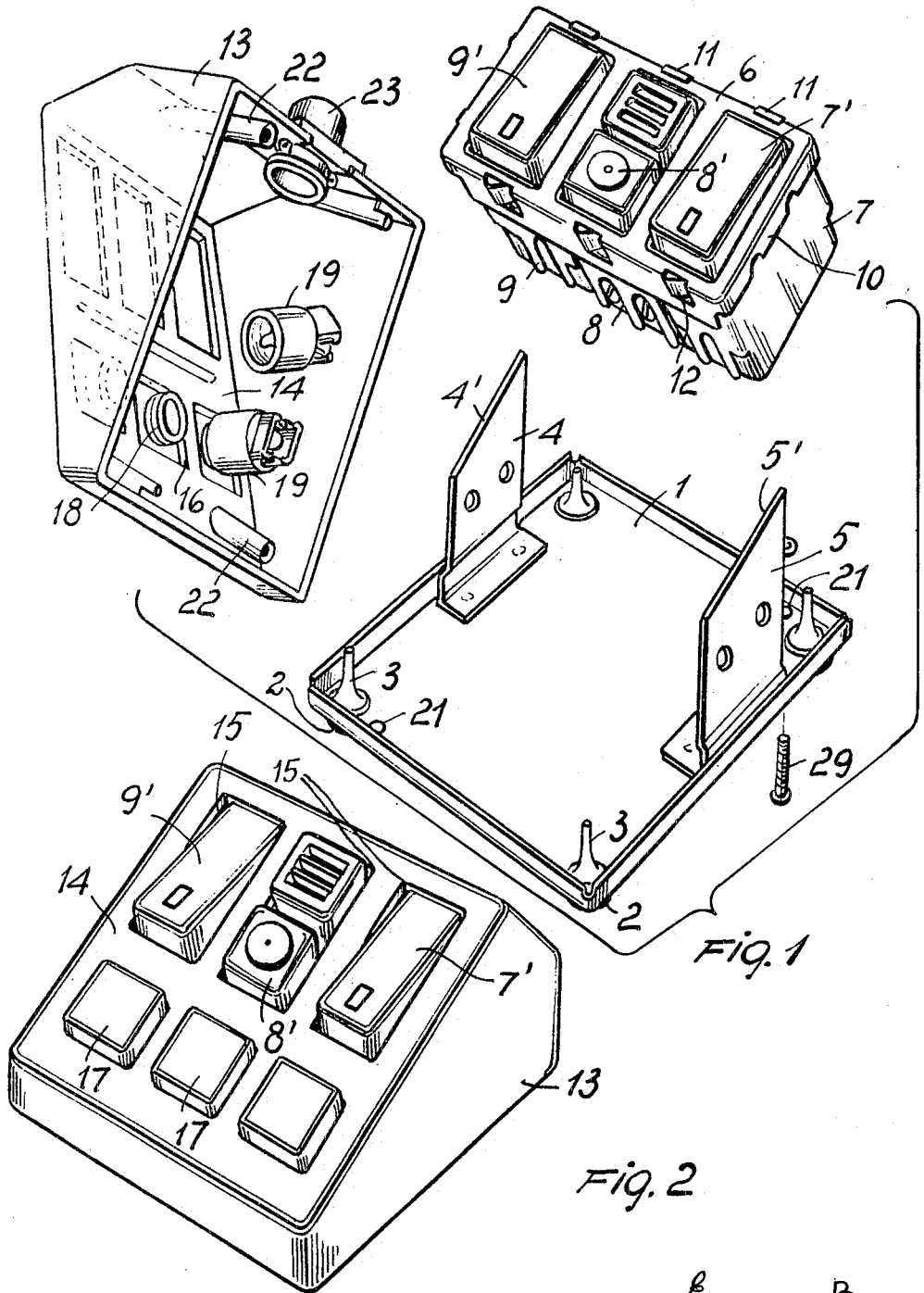

3,512,153
ELECTRIC SMALL TABLE-CONTROL-PANEL WITH CONVENTIONAL DEVICES FOR ELECTRIC ENERGY DISTRIBUTING PLANTS
Ermanno Bassani, Corso di Porta Vittoria 9, Milan, Italy
Filed Apr. 11, 1967, Ser. No. 630,038
Claims priority, application Italy, Apr. 12, 1966, 4,273/66
Int. Cl. H02b *15/00;* G08b *5/00;* G09f *9/00*
U.S. Cl. 340—366           4 Claims

ABSTRACT OF THE DISCLOSURE

An electrical control panel includes a base member which can be positioned on a supporting surface and a frame member whose dimensions are such as to be accommodated within the outline of the base member. A plurality of modular electrical devices are mounted in the frame member and each have an exposed portion located at one side of the frame member. Support means is provided on the base member and supports the frame member with the electrical devices in a position in which the one side of the frame member is inclined at a predetermined angle with respect to the base member and to a support surface therefor. A cover is provided overlying the base member and covering the frame and it has an external surface inclined to the base member and to the support surface at an angle which is at most slightly different from the predetermined angle. The external surface is provided with a plurality of cutouts in each of which the aforementioned portion of one of the electrical devices is visible and accessible. Connecting means connects the cover with the base member.

---

This invention relates to a table small control panel comprising conventional devices of electric energy distributing plants, such as switches of different known kinds, sockets, electric bells and the like, having the same shape of electric devices set up on usual supporting frames.

A further purpose of this invention is to control by means of such a small control panel other electrical devices besides the usual simple signalling electric means.

Still another purpose of this invention is to obtain a table small control panel of simple and economical construction and mounting, such as to admit of being manufactured in large quantities or mass-fabrication, although strong and high qualities of usual electric devices are used thereto.

An object of this invention is also to obtain a small electric table-control-panel, wherein the electric devices therein contained can be installed in a wide variety of combinations in easy and rapid manner, thus facilitating both mounting and installation of said small electric table-control-panel.

The electric table-control-panel according to this invention is composed of a ground plate from which two lateral supporting parts or walls to project, being provided with the purpose to support in an inclined position from the rear to the front portion of the panel the series of electric devices to be enclosed therein of the installation of the kinds used in conventional electric devices enclosed in wall partition or the like, and provided with small windows, from which said devices project outwards, for the purpose of being controlled or to some signal information or the like to a person seated at the table or the like furniture, all components being contained within a housing showing corresponding openings at its inclined front wall, from which said devices or their controlling or signalising means project outside, said housing being fastened to the mentioned ground plate preferably by means of screws or the like.

In correspondence with each one of said windows of said housing there are foreseen holes wherein fastening tongues can be introduced for the indication of the function or destination of the corresponding electric device mounted therein and wherein said small plates can be provided with according lamps at their rear portion in order to consent that their signs or marks are seen also in darkness conditions.

The object of this invention is described in more details hereinunder and illustrated on the attached sheet of drawings, of which:

FIG. 1 is the small electric table-control-panel in exploded view, and

FIG. 2 shows in perspective view the small table-control-panel seen from outside.

The table-control-panel of this invention comprises a ground plate 1 of square or rectangular configuration provided with supporting feet of rubber 2 which project to the interior of the panel and are there configurated as upwardly directed small projections 3.

From two opposed lateral sides of said plate 1 there are provided two supporting vertically disposed sheet elements 4, 5 of strong and resistant material, as iron sheet, having upper edges 4' and 5', inclined in a common plane of inclination.

On said supporting means 4 and 5 a small frame 6 is applied, which bears the necessary or required electric devices 7, 8, 9 used to compose the invention like table-control-panel, the fixing of which devices on said control panel taking place by introducing said inclined borders 4' and 5' into the gaps resulting between the lateral walls 10 of said small frame 6 and the side walls of the electric devices 7 and 9, such that said small frame 6 disposes onto said plates 4 and 5 assuming the same inclination as shown by the mentioned plate borders 4' and 5'.

Frame 6 is already known per se.

It is provided with front windows of the necessary sizes, and from which the control portions 7', 8' and 9' for the supported electric devices project. These electric devices are generally of the kinds used in conventional electricity distributing systems, and provided with a stirrup having two end tongues. A first of such tongues 11 of each electric device is introduced into a slit on a side portion of frame 6, while the other of such tongues is held by a further tongue 12 foldable for its introduction into a window provided at the other side portion of frame 6.

In this manner, there can be easily and rapidly combined electric devices of various kinds and functions in frame 6. The drawing has for instance devices 7 and 9 which are two switches, while device 8 comprises a push button and a bell both placed side-by-side. The combination, of course, can be changed or otherwise disposed and/or a different number of devices can be used, this according to the function, purpose or nature of their operation, shape and size. For instance, they can be lighting and signalling means, or sockets for electric plugs or the like.

After the frame 6 has been applied on said supporting vertical plates 4, 5, the whole can be enclosed within a common housing 13 the vertical, lateral walls of which will surround plate 1.

Housing 13 shows a large front wall 14 showing the same inclination of frame 6. This front wall 14 is provided with windows 15, which are in correspondence with the windows of frame 6, so that the control means or the caps of the underneath disposed devices 7, 8 and 9 will project from said frame and in the same time project also from said windows 15, as shown in FIG. 2.

Corresponding with said windows 15, the front inclined wall 14 may show holes 16, wherein there are inserted small plates 17 for indicating the purpose of the repective device. These small indicating plates may be opaque, transparent or translucent. In both these last cases, the plates 17 will be provided at their rear side with elements 18 for the insertion of sockets of small electric lamps for illuminating purposes, that is to say in order to have said lamps in condition to light.

Housing 13 is fastened to the ground plate 1 by means of screws 20 penetrating holes 21 of said housing and engaging small locking and internally threaded cylinders 22 disposed within said housing.

At its rear portion, housing 13 supports a passage 23 for the introduction of an electric cable composed of electrical conductors for the connection of the panel to its sources of energy and to externally located devices associated with the table-control-panel.

What I claim is:

1. A device of the character described, comprising in combination, a base member adapted to be positioned on a substantially horizontal supporting surface; a frame member having overall dimensions at most approaching those of said base member so as to be accommodated within the outline of the same; a plurality of modular electrical devices mounted in said frame member and each having an exposed portion located at one side of said frame member; a plurality of upwardly projecting substantially vertical support members secured at their bottom ends to said base member and secured at points spaced from their bottom ends to opposite side of said frame member carrying said frame member above said base member with said one side inclined at a predetermined angle to said base member and to a support surface on which the latter is positioned; a cover on said base member overlying said frame and having an external surface inclined at a given angle at most slightly different from said predetermined angle relative to said base member and support surface, said external surface being provided with a plurality of apertures so positioned that each has located therein the exposed portion of one of said modular electrical devices; and connecting means releasably connecting said cover and said base member.

2. A device as defined in claim 1, wherein said modular electrical devices comprise signal-initiating devices and signal-generating devices.

3. A device as defined in claim 1, wherein said support means comprises a pair of projections extending upwardly from said base member and each having an upper edge portion inclined to said base member at said predetermined angle, each of said edge portions supportingly engaging one of two transversely spaced opposite sides of said frame member for maintaining the latter at said predetermined angle.

4. A device as defined in claim 1, wherein said predetermined and said given angles are identical.

References Cited

UNITED STATES PATENTS 2,579,618   12/1951   Scofield _____ 340—381
3,218,519   11/1965   Casey _____ 317—119

JOHN W. CALDWELL, Primary Examiner

M. R. SLOBASKY, Assistant Examiner

U.S. Cl. X.R.
317—119; 340—381